United States Patent [19]
Kagami et al.

[11] Patent Number: 5,974,400
[45] Date of Patent: Oct. 26, 1999

[54] TRYING-ON APPAREL VIRTUALLY (ELECTRONICALLY) WHILE PROTECTING PRIVATE DATA USING IRREVERSIBLE PROCESS

[75] Inventors: Akira Kagami, Sagamihara; Toshiyuki Ono; Haruko Nagaoka, both of Kawasaki; Mitsuo Sudo, Tokyo, all of Japan

[73] Assignee: Hitachi, Ltd., Tokyo, Japan

[21] Appl. No.: 09/004,572

[22] Filed: Jan. 8, 1998

Related U.S. Application Data

[62] Division of application No. 08/556,538, Nov. 13, 1995, Pat. No. 5,724,522.

[30] Foreign Application Priority Data

Nov. 17, 1994 [JP] Japan .................................. 6-283514

[51] Int. Cl.$^6$ .................................................. G06F 15/17
[52] U.S. Cl. .............................. 705/26; 705/27; 395/186; 395/187.01; 395/200.3; 395/200.49; 395/200.76
[58] Field of Search ............................... 395/186, 187.01, 395/200.3, 200.47–200.49, 200.76; 705/26, 27; 380/23–25

[56] References Cited

U.S. PATENT DOCUMENTS

| | | | |
|---|---|---|---|
| 4,553,222 | 11/1985 | Kurland et al. | 395/215 |
| 4,882,475 | 11/1989 | Miller et al. | 235/383 |
| 4,956,863 | 9/1990 | Goos | 380/30 |
| 4,984,155 | 1/1991 | Geier et al. | 395/226 |
| 5,053,956 | 10/1991 | Donald et al. | 364/401 |
| 5,231,571 | 7/1993 | D'Agostino | 364/408 |
| 5,241,464 | 8/1993 | Gruelich et al. | 395/226 |
| 5,261,070 | 11/1993 | Ohta | 395/425 |
| 5,267,171 | 11/1993 | Suzuki et al. | 364/479.04 |
| 5,283,731 | 2/1994 | Lalonde et al. | 364/401 |
| 5,343,529 | 8/1994 | Goldfine et al. | 380/23 |
| 5,353,219 | 10/1994 | Mueller et al. | 395/216 |
| 5,440,479 | 8/1995 | Hutton | 395/226 |
| 5,515,268 | 5/1996 | Yoda | 395/226 |
| 5,524,073 | 6/1996 | Stambler | 380/24 |
| 5,528,490 | 6/1996 | Hiil | 395/712 |
| 5,562,550 | 10/1996 | Chartrand | 473/131 |
| 5,727,163 | 3/1998 | Bezos | 395/227 |

OTHER PUBLICATIONS

Home-shopping (CATV shopping) system using bi-directionality of a CATV "A well understandable guide to Distribution Industry" p. 200 Fuji Financial Data, Laboratory 1992 Nippon Jitsugyo Shuppan.

Appearance Evaluation Using 3-Dimensional Model, You-chi Kato, et al., "Computer Graphics in Apparel Industry", Information Processing vol. 29, No. 10, Oct. 1988.

"3D Measurement of Human Body" Hiroshi Nakano Journal of Society of Instrument control Engineers vol. 27, No. 9, Sep. 1988, pp. 781–786.

"TV Shopping Age" Kensuke Kojima, pp. 43–49, 1994, Chuoh Keizai Sha.

"Simulation of Wearing clothes" Yoshihiro Hayashi p. 17, "New Technology of Apparel CAD", Journal of Society of Instrument and Control Engineers, vol. 27, No. 9, Sep. 1988.

*Primary Examiner*—Lance Leonard Barry, Esq.
*Attorney, Agent, or Firm*—Fay, Sharpe, Beall, Fagan, Minnich & McKee

[57] ABSTRACT

A user of services is enabled to utilize a highly value-added service employing secret data of the user without presenting the data to the service provider side. In a system in which a server is coupled with a client via a communication network, the client inputs and sends a service identifier to the server, receives a program to execute the service from the server, inputs secret data as client controlled data from an input device and sends a server control data request to the server, and then receives the requested data from the server. The input data is irreversibly processed by use of the program and received data such that the client sends results of the process to an expert on the server side to receive an advice of the expert. By referring to the advice, the service user inputs evaluation of the outputted results. The steps beginning at the data request input are repeatedly conducted until the evaluation becomes satisfactory, thereby transmitting the process results to the server.

11 Claims, 10 Drawing Sheets

(SERVICE SELECTION MENU (WINDOW))

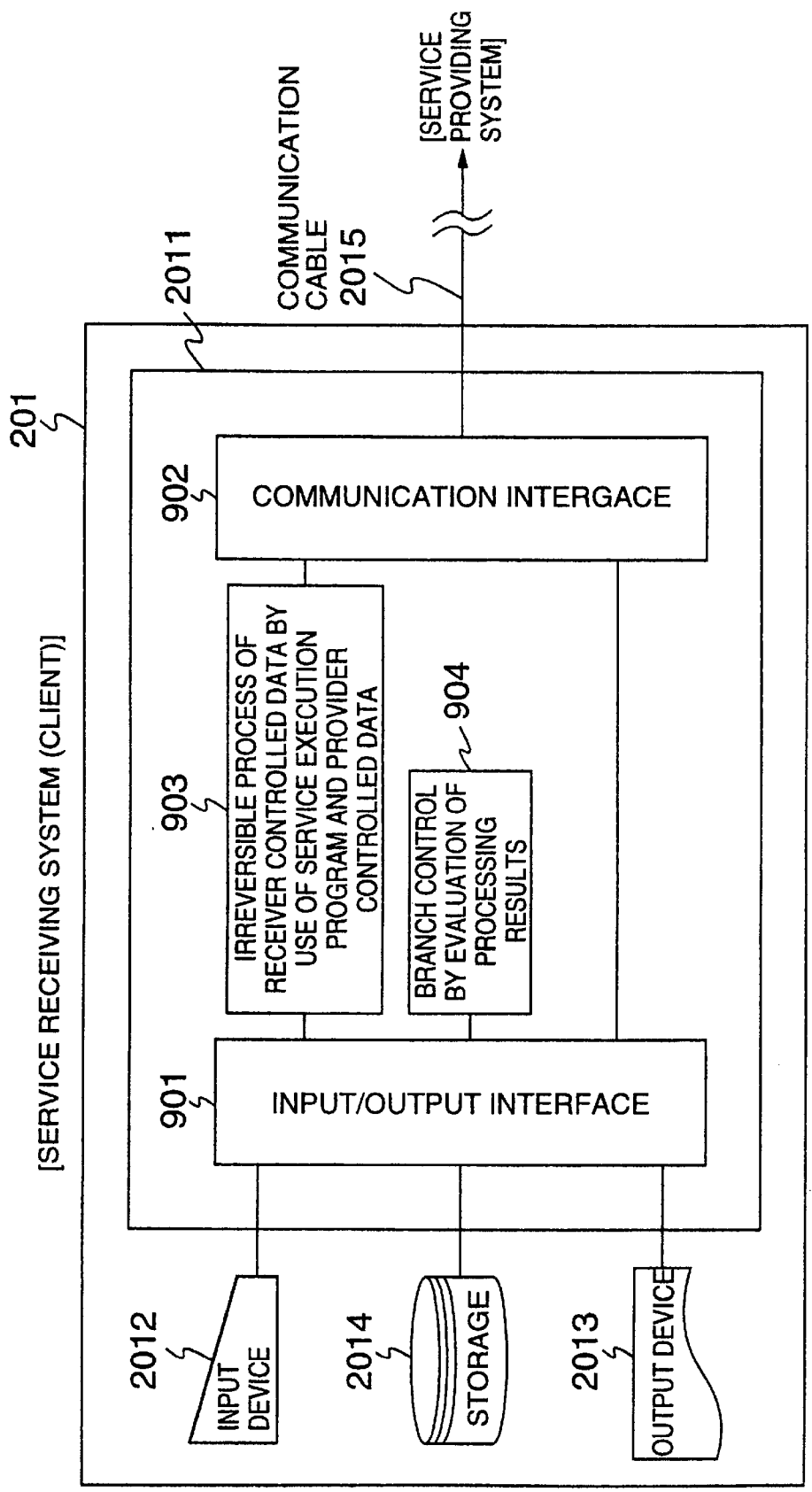

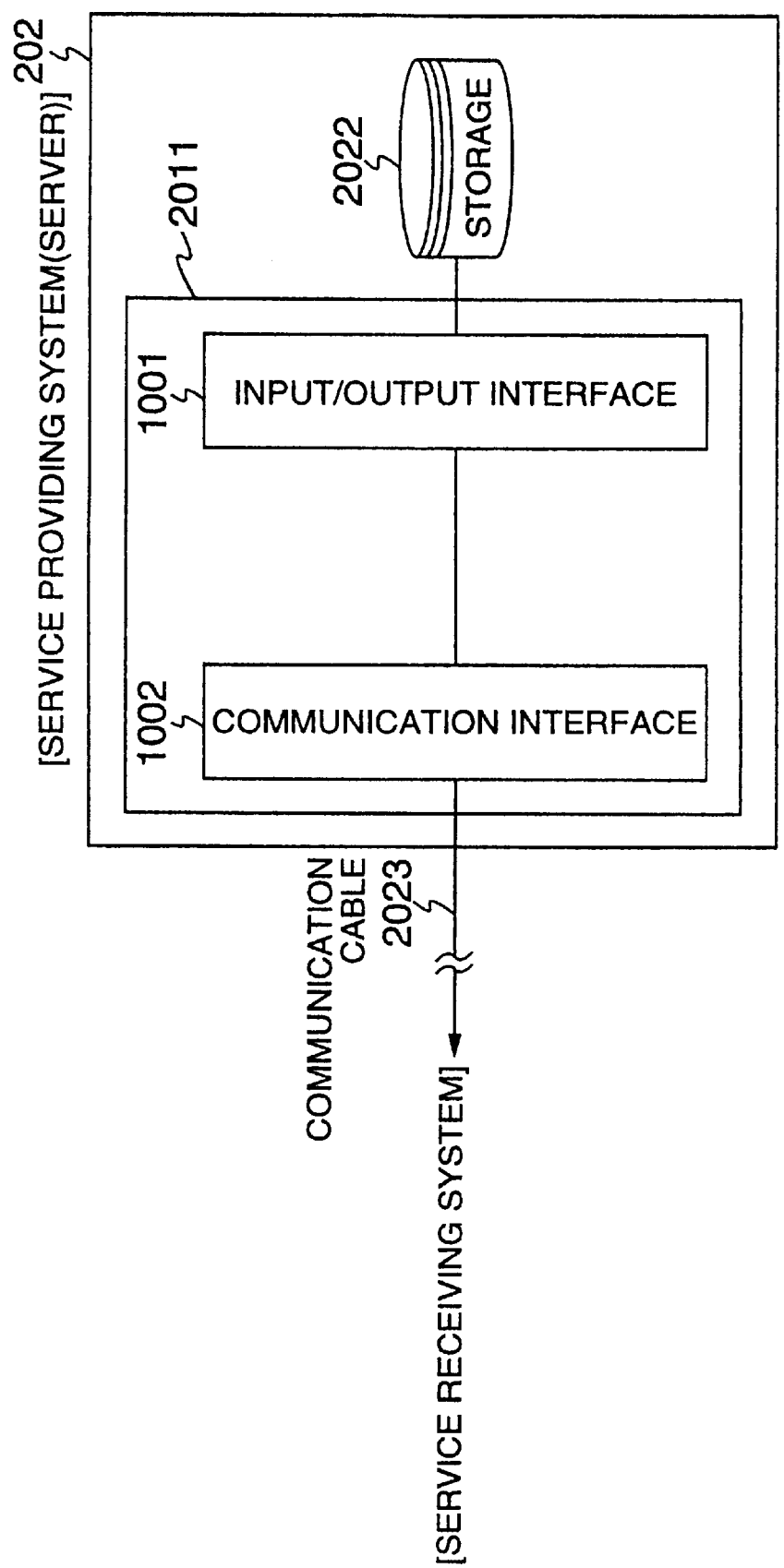

TRYING-ON APPAREL VIRTUALLY (ELECTRONICALLY) WHILE PROTECTING PRIVATE DATA USING IRREVERSIBLE PROCESS

This is a divisional of application Ser. No. 08/556,538, filed Nov. 13, 1995, U.S. Pat. No. 5,724,522.

BACKGROUND OF THE INVENTION

The present invention relates to a method of and a system for online interactive service using a high-speed communication network such as a B-ISDN or a bi-directional CATV network, for example, to a method and a system in which, like in such a highly value-added service necessitating secret data of a service receiver (client) as a virtual try-on function of apparel goods in CATV shopping or in a pre-designing function of financial service items such as an education loan, the service can be received without presenting the secret data to the service providing (server) side.

Conventionally, as a typical example of an online interactive service system via a high-speed communication network, there has been a home-shopping (CATV shopping) system using bi-directionality of a CATV as described in page 200 of "Well Understandable Guide to Distribution Industry" edited by Fuji Financial Data Laboratory and published in 1992 from Nippon Jitsugyo Shuppan.

In the CATV shopping system, a consumer selectively calls a desired goods guide program and transmits order information (including a program number and an item number) of a favorite item of goods via a CATV line to a retailer, thereby making a sales contract.

Moreover, according to description in pages 43 to 49 of "TV Shopping Age" written by Kensuke Kojima and published in 1994 from Chuoh Keizai Sha, almost all kinds of goods are available in recent CATV shopping systems and the share of sales of apparel goods is remarkably increased in a reliable fashion and hence the apparel goods are expected as main goods for sales.

Many apparel goods are relatively expensive and the sale thereof depends highly on preference of consumers. Consequently, most consumers consider to first actually put a desired item on to confirm "appearance" and "comfortness" thereof (through the try-on) before deciding the purchasing of the item. Conventionally, a considerable number of commodities purchased in CATV shopping systems have been returned. This situation also occurs because of unavailability of the try-on service. Naturally, due to a characteristic of CATV shopping, it is in principle impossible that the consumer actually (physically) conducts the try-on of an article of apparel goods. However, using "virtual try-on function" to confirm appearance and comfortness in the information processing world, the try-on can be accomplished by the conventional technology. That is, when the function is provided as a highly value-added service in the CATV shopping, the ratio of articles returned primarily because of difference in image and/or size can be decreased. Furthermore, it is possible to enhance utilization of users of TV shopping who have avoided the TV shopping because of unavailability of the try-on.

However, the virtual try-on function is achieved on assumption of utilization of data indicating physical characteristics related to privacy of the consumer. When such data having high secrecy is passed to the server to request the overall process, the service receiver has psychological hesitation due to possibility of ill-intended use thereof and hence it is afraid that this may limit utilization of the CATV shopping system. The present invention has been made in consideration of the problem above.

SUMMARY OF THE INVENTION

It is therefore an object of the present invention to provide a method of and a system for online interactive service such as a CATV shopping system in which when a service user receives a highly value-added service necessitating data of secrecy thereof, it is possible for the user to receive the service without presenting the data of secrecy to the service providing side.

To achieve the above object according to the online interactive service method of the present invention, in an online interactive service system in which a service providing system (server) is linked with a service receiving system (client) via a communication network service, the client inputs an identifier of service from an input device, sends the identifier to the server, and receives a program to execute a service corresponding to the identifier from the server and then stores the program in a storage. The client then inputs from the input device data (data having high secrecy) to be controlled by a user of the client, inputs from the input device a transmission request of data controlled by the server, sends the transmission request of data to the server, receives data corresponding to the transmission request from the server, irreversibly processes the inputted data according to the program and the data controlled by the server, outputs from an output device results of the process, and presents the results to an expert on the server side and receives an advice therefrom. Moreover, the client inputs from the input device evaluation for the outputted results by referring to the advice and repeats the process beginning at the data transmission requests until the evaluation becomes satisfactory. Incidentally, the irreversible process is a process in which the original data cannot be restored from data resulted from the process. With this provision, the original data is not passed to the communicating partner.

On the other side, the server receives the identifier sent from the client, retrieves from the storage a program to execute a service corresponding to the identifier, and sends the program to the client, receives the data transmission request sent from the client. The server thereafter retrieves from the storage data corresponding to the transmission request and then sends the data, presents the process results sent from the client to an expert and receives an opinion therefrom, sends the opinion to the client, and then receives evaluation from the client.

According to the present invention, the client issues a service request to the server to receive a program of the service from the server and then the client inputs data having a high secrecy of a user. The client operates the program sent from the server side for the data having secrecy and the data on the server side without passing the data to the server side, thereby achieving an irreversible process. In this manner, the virtual try-on of apparel goods and the pre-design of financial services such as an education loan can be implemented. Additionally, since the data having secrecy is not presented to the server side, it is possibly to protect privacy of each consumer. there does not arise any social problem.

BRIEF DESCRIPTION OF THE DRAWINGS

These and other objects and advantages of the present invention will become apparent by reference to the following description and accompanying drawings wherein:

FIG. 9 is a diagram showing the system configuration of a client constituting the online interactive service system according to the present invention; and FIG. 10 is a diagram showing constitution of a server constituting the online interactive service system.

DESCRIPTION OF THE PREFERRED EMBODIMENTS

According to the principle of the present invention, even for a high-grade service requiring data having high secrecy of a user, a program to execute the service is down-loaded from a server onto a client such that data having high secrecy is inputted and processed completely under control of the user to send only results of the process to the server. As a result, there does not exist any fear that secret data is directly passed to a third person to be ill-intendedly utilized. That is, the process of the program is irreversible and hence even if the process results are passed to a third person, the original data (i.e., data having high secrecy) cannot be completely restored and hence there does not exists any fear of malicious use of the data.

In the irreversible process, for example, the original data is transformed into attribute data including the pertinent data or another data which cannot be restored.

Figure 1:
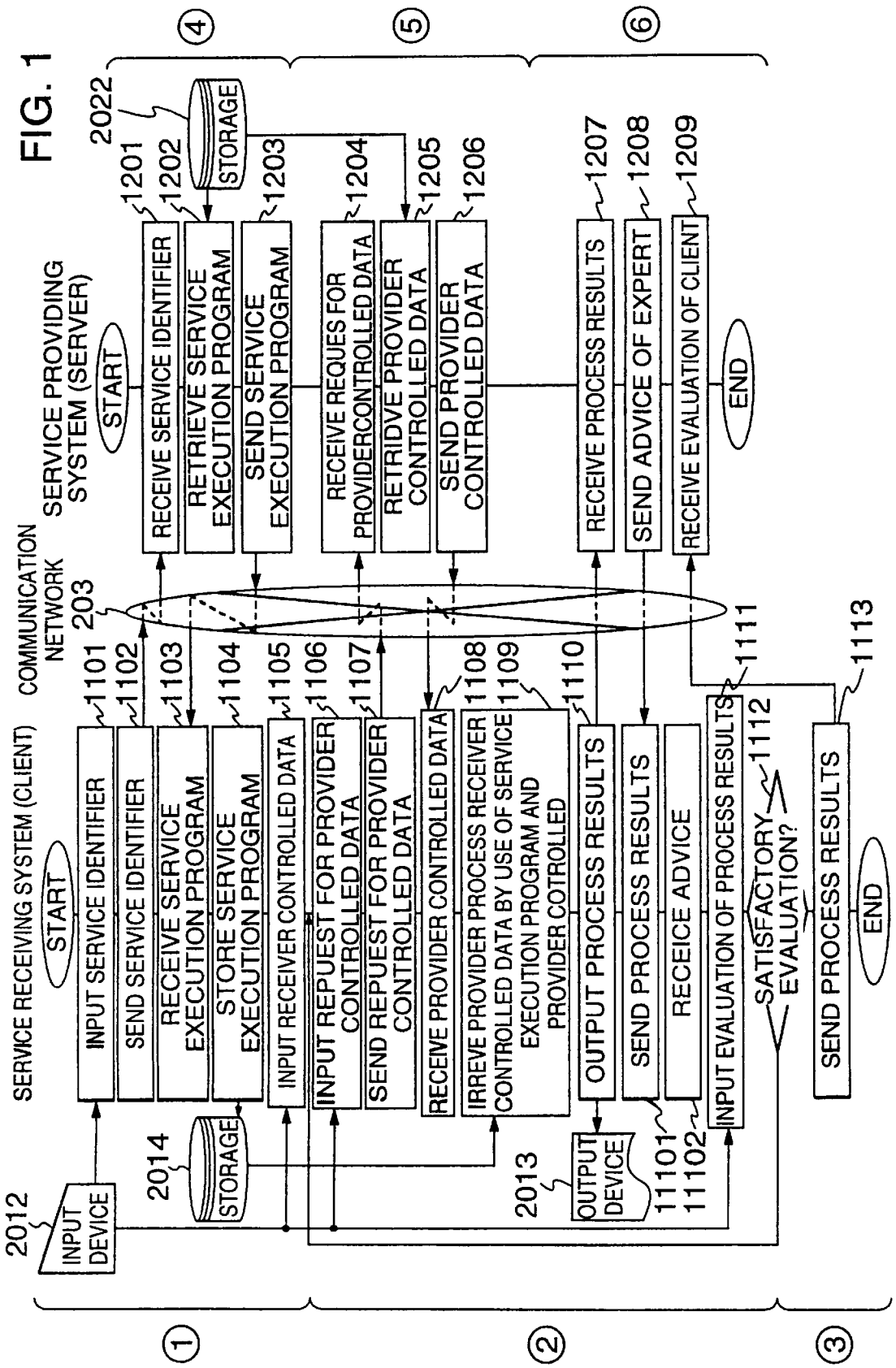
FIG. 1 is an operation flowchart showing a method of online interactive service in a first embodiment according to the present invention.
Figure 2:
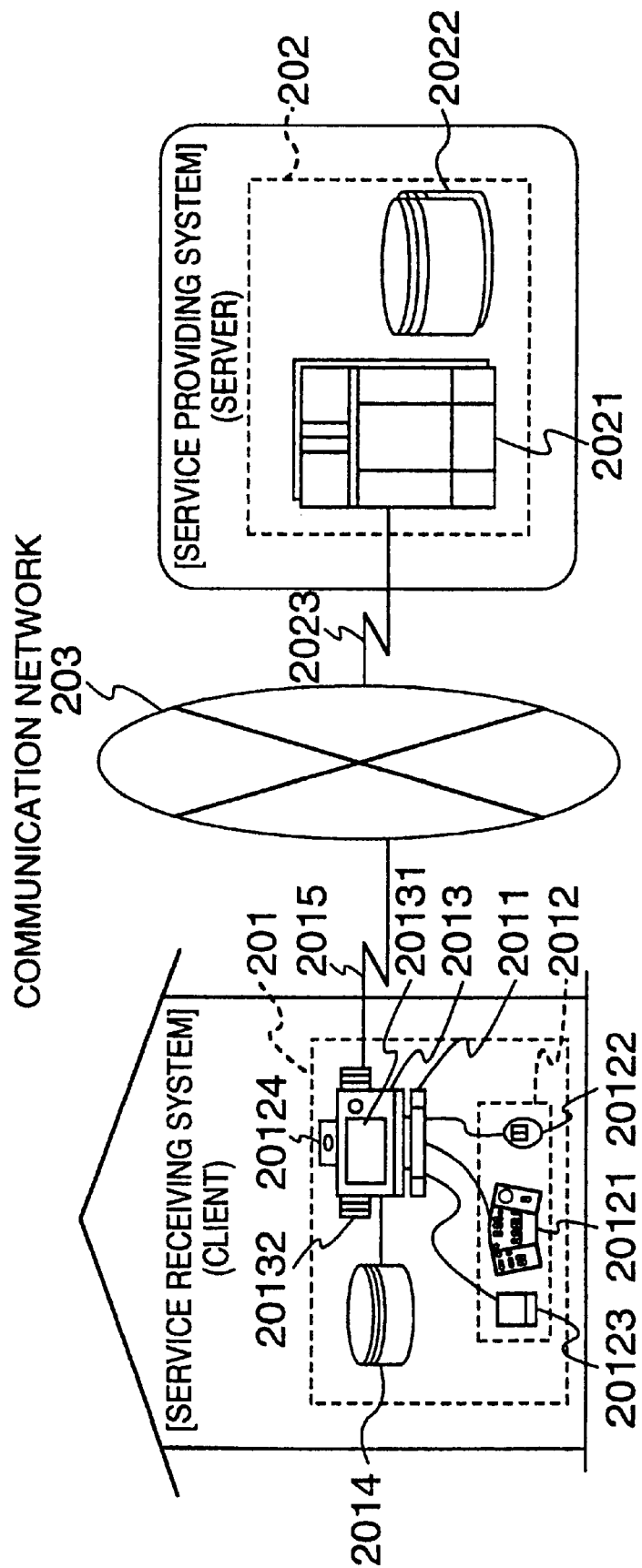
FIG. 2 is an overall image showing constitution of a system for online interactive service to implement the first embodiment.

FIG. 1 is a process flowchart of a method of online interactive service showing a first embodiment of the present invention, whereas FIG. 2 is a diagram showing constitution of an apparatus to which the method of FIG. 1 is applied.

In FIG. 2, the online interactive service system of the present invention includes a client 201 as a service receiving system is coupled via a high-speed communication network 203 with a server 202 as a service providing system.

In the first embodiment, description will be given of operation of a general service system applicable to any services, namely, the kinds of services are not specified.

(1) Apparatus constitution of client

The client 201 includes a computer 2011 connected to an input device 2012, an output device 2013, a storage 2014, and a communication line 2015. The input device 2021 is a combination of a keyboard 20121, a mouse 20122, an IC card reader 20123, and a TV camera 20124. Additionally, the output device 2013 is a combination of a display 20131 and a speaker 20132. The display 20131 is desirably a highly-fine color display capable of presenting natural colors thereon. The storage 2014 may be a magnetic disk, an optical disk, an opto-magnetic disk, or a semiconductor memory. It is only necessary that the storage has a storage capacity sufficient to store therein files for execution of programs and for a large amount of data. Like an optical cable, the communication cable 2015 is favorably capable of a high-speed communication of images also including color mobile images.

In short, the apparatus configuration to implement the present invention need only be a construction generally called a computer system. Specifically, there is required only a configuration which can be possessed, like a personal computer, by a general user in the family. Moreover, the configuration may include dedicated devices. In such a case, the peripheral device functions described above are required to be provided.

(2) Apparatus constitution of server

The server 202 includes a computer 2021 to which a storage 2022 and a communication cable 2023 are connected. Each of these devices is required to be constructed as described in conjunction with the apparatus constitution of the client 2. However, the server provides services to many users at the same time and hence is desirably a computer system having a higher speed and a larger capacity when compared with the client 201. Concretely, the server 202 is desirably a large-sized computer or a high-performance workstation and may naturally be a dedicated apparatus. In this case, there are required the functions of peripheral devices as described for the client side.

(3) Apparatus constitution of communication network

The apparatus constitution of the communication network 203 is desirably equivalent to that of a high-speed communication network such as a B-ISDN or bi-directional CATV.

(4) Operation of processing of client

In FIG. 1, a user of the client inputs from the input device 2012 an identifier of a desired service to be received (step 1101). Next, the client 201 sends the inputted identifier via the communication network 203 to the server 202 (step 1102).

Subsequently, a program to execute the service corresponding to the identifier is sent from the server 202, and the client 201 receives the program (step 1103). The client 201 stores the received program in the storage 2014 (step 1104). The user of the client 201 inputs data to be controlled by the user (data having high secrecy) from the input device 2012 (step 1105). The user then inputs from the input device 2012 a transmission request of data controlled by the server 202 (step 1106). The client 201 sends the data transmission request thus inputted via the communication network 203 to the server 202 (step 1107). The data corresponding to the transmission request is sent from the server 202 via the communication network 203, and the client 201 receives the data (step 1108). Next, using both of programs stored in the storage 2014 and the received data, the client 201 irreversibly processes the inputted data (step 1109). The client 201 outputs from the output device results of the irreversible process (step 1110). The client 201 sends the results of process to an expert on the side of server 202 for an advice (step 11101). By referring to the process results and advice, the user inputs his or her evaluation (step 1111). When the inputted evaluation is not satisfactory (step 1112), control is returned to step 1106 to again issue a request to the server 202 for data. On the other hand, when the inputted evaluation is satisfactory (step 1112), the client 201 sends the results of evaluation via the communication network 203 to the server 202 (step 1113).

(5) Operation of processing of server

The server 202 receives the identifier sent from the client 201 via the communication network 203 (step 1201). The server 202 retrieves from the storage 2022 a program to execute the service corresponding to the received identifier (step 1202). Next, the server 202 sends the retrieved program via the communication network 203 to the client 201 (step 1203). Thereafter, the server 202 receives a data transmission request sent from the client 201 via the communication network 203 (step 1204). The server 201 retrieves from the storage 2022 data corresponding to the transmission request (step 1205). The server 201 then sends the retrieved data via the communication network 203 to the client 201 (step 1206). Next, the server 201 receives results of process sent from the client 201 via the communication network 203 (step 1207). The process results are presented to an expert for an opinion and then the opinion is sent to the client 201 (step 1208). Finally, the server 201 receives evaluation from the client 201 via the communication network 203 (step 1209). As a result, a data request is to be sent from the client if the evaluation is not satisfactory, and hence the server 202 waits for the data request (step 1204).

As above, according to the method of online interactive service of the first embodiment, the service user can utilize a highly value-added service requiring secret data of the user without presenting the data to the server.

Classifying operation steps of FIG. 1 into groups, description will be given of an outline of the processing flow.

The operation on the client side includes three groups ①, ②, and ③. Furthermore, the operation on the server side includes three groups ④, ⑤, and ⑥.

Group ① on the client side is a stage of preparation for service reception and includes an operation to input a service identifier, an operation to receive a service executable program from a server and store the program in a storage, and an operation to input user controlled data, i.e., secret data. This group is a stage of preparation for service reception Subsequently, group ② on the client side is a part in which an irreversible process is repeatedly executed for data from the server and hence conducts a primary process to actually receive a service.

The last group ③ on the client side executes a process to send to the server side the results of evaluation conducted by the user on the client side. This group is namely a final decision process.

Furthermore, group ④ on the server side is a preparation stage ranging from reception of an identifier from the client side to transmission of a service executable program corresponding thereto.

Subsequently, group ⑤ of the server side is a process to repeatedly transmit control data to the client in response to a request from the client side.

The final group ⑥ on the server side is a final process ranging from reception of the process results from the client to obtain an opinion of an expert to reception of the final evaluation from the client.

Next, description will be given of a case as a second embodiment in which the present invention is applied to a CATV shopping system of apparel goods including a function of "virtual try-on service".

In this connection, the virtual try-on service is a function in which "appearance" and "comfortness" of an item of apparel goods is virtually confirmed only in the information processing world without physically conducting the try-on of the item.

For example, a technology applicable to materialization of the function of the former (appearance) has been described in "Appearance Evaluation Using a 3-Dimensional Model" written by Yoichi Kato et al in pages 1163 of "Computer Graphics in Apparel Industry" (Information Processing, Vol. 29, No. 10, October 1988). According to the technology, measured data of a human body is processed to create wire data by linking cross sections with each other in the x-y plane of the human body along the z-axis direction. Thereafter, a shade surface process and a gray-scale display process are executed for the wire data to create a 3D model of the human body. The contour of the 3D model is traced by a tablet to draw a planar design of an article of clothes such that a color operation is conducted for the planar design and the data of 3D model displayed so as to produces a fitting state of the article on the model. Using the technology, the try-oner of a particular item need only provide a his or her 3D model to appropriately recognize appearance of the item on the basis of the silhouette of the user. In this regard, the presentation of a face of the user on the 3D model is technologically equivalent to that used when displaying the item put on the user.

On the other hand, a technology applicable to materialization of the function of the latter (comfortness)" has been described in "Simulation of Wearing Clothes" written by Yoshihiro Hayashi in page 17 of "New Technology of Apparel CAD" (Journal of Society of Instrument and Control Engineers, Vol. 27, No. 9, September 1988). In this system, each part is subdivided into a finite number of triangular elements, i.e., about several thousand elements such that according to a relationship between stress and distortion related to mechanical characteristics (characteristic of expansion and contraction, shearing characteristic, bending characteristic, empty weight, etc.) of the cloth used, thereby formulating the state of article of clothes put on the body in terms of potential energy. The state of the article on the body is considered to be expressed when the potential energy takes an extreme value. In a process of solving the cloth distortion problem, a check can be made for interference between the article and the body on which the article is put.

Using the technology, the try-oner need only provide data of his or her body (body contour) to qualitatively attain "comfortness" of a favorable article of clothes.

As described above, the virtual try-on service is a function which can be technologically realized. However, in this service, the try-oner is required to provide such data items having high secrecy as those of his or her face and body shape, and hence it is considered that there strongly arises a psychological resistance against utilization of the service. This is an essential problem to be solved.

Figure 3:
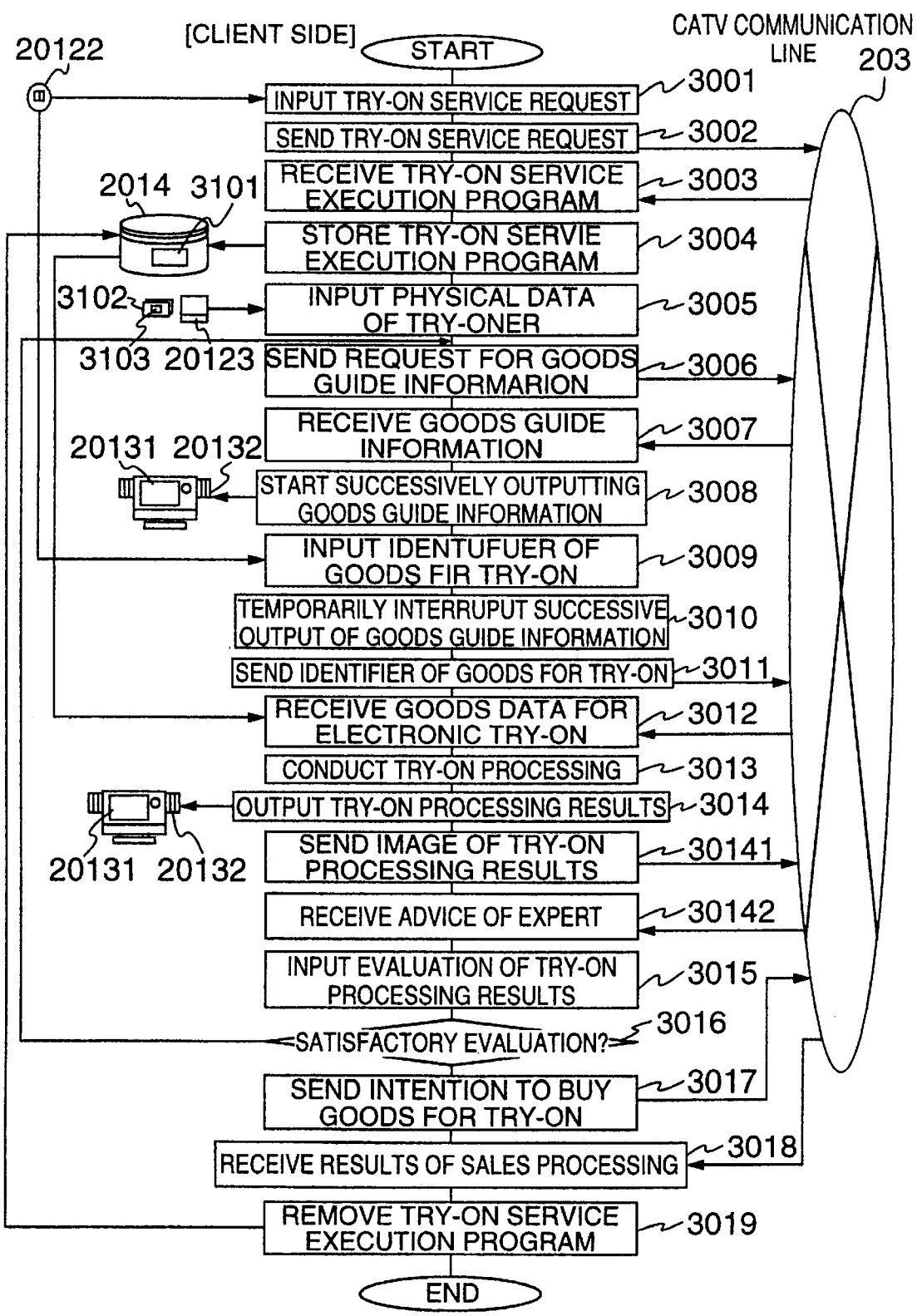
FIG. 3 is a processing flowchart (on the client side) showing a method of online interactive service in a second embodiment according to the present invention.
Figure 4:
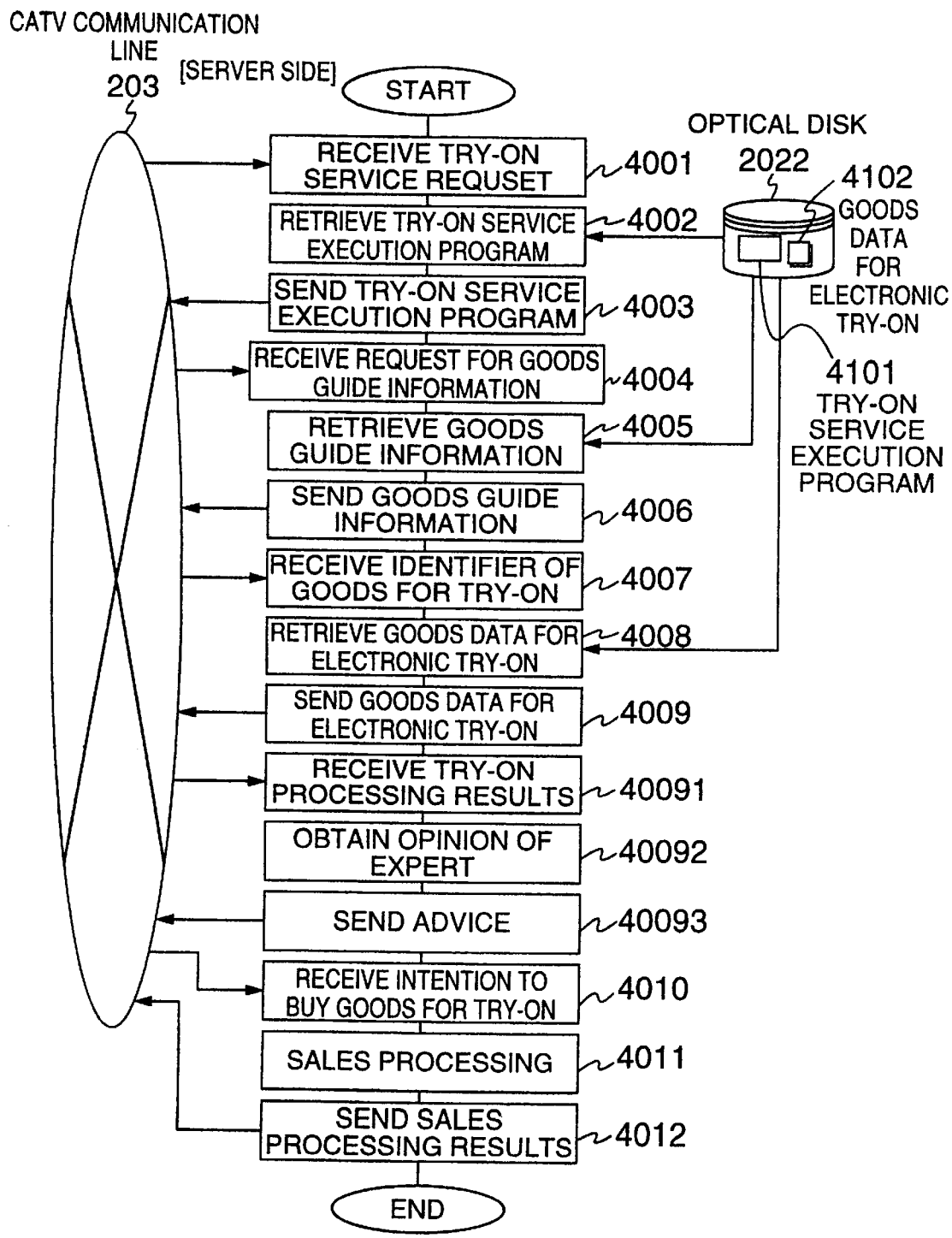
FIG. 4 is a processing flowchart (on the server side) showing the method of online interactive service in the second embodiment of the present invention.
Figure 5:
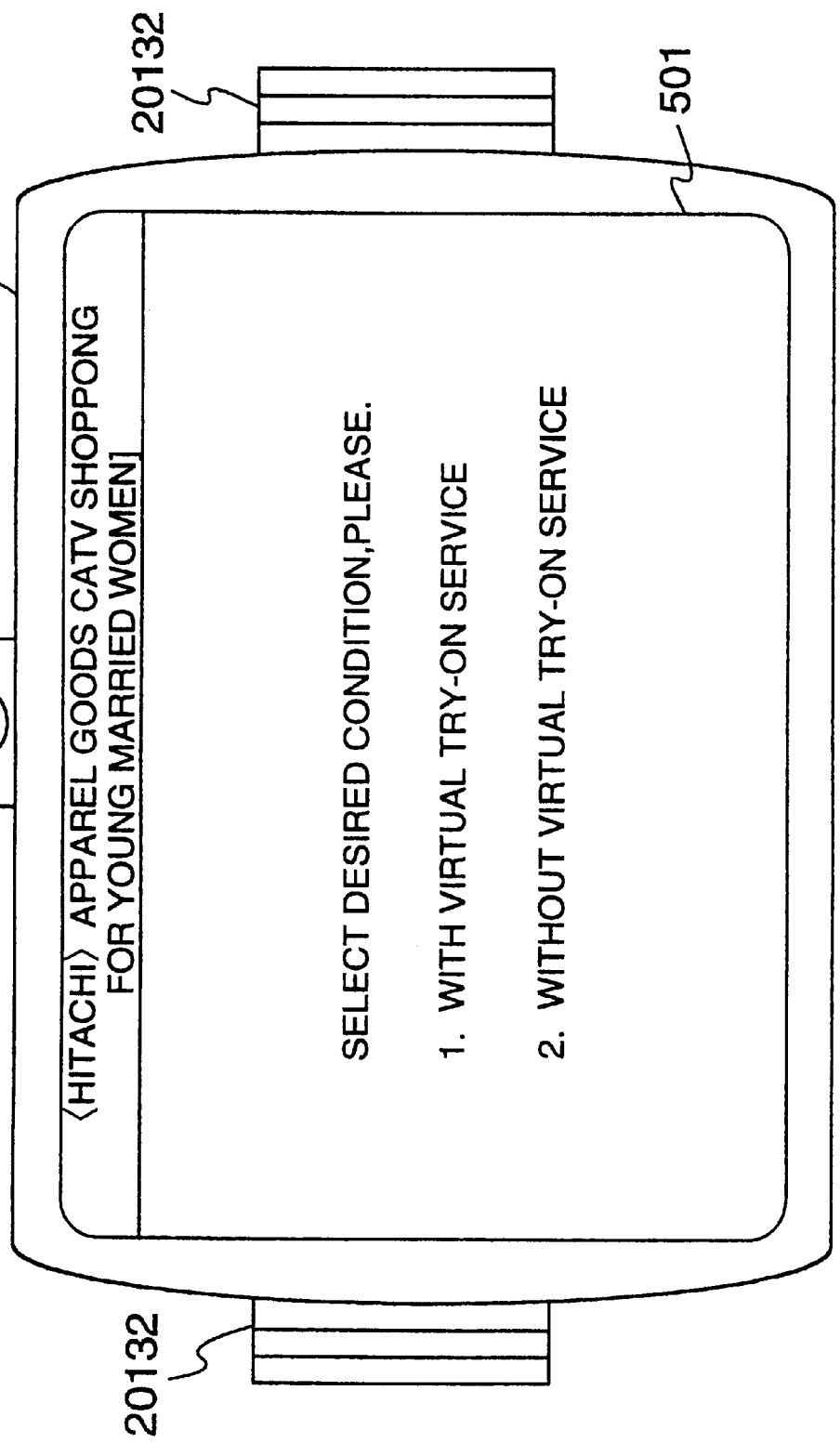
FIG. 5 is a diagram showing a try-on service selection menu.

FIGS. 3 and 4 are flowcharts of a method of online interactive service for the virtual try-on service according to the second embodiment of the present invention and FIG. 5 is a diagram showing a service selection menu.

The system configuration includes, like the first embodiment shown in FIG. 2, a client 201, a server 202, and a CATV line 203 connecting the client 201 to the server 202.

The client 201 and server 202 communicate data and information therebetween to establish synchronization of processing steps respectively thereof. In this regard, unless otherwise specified, "try-on" is assumed to be equivalent to "virtual try-on" herein below.

<Client: Step 3001> Input of try-on service request

The service selection menu 501 of FIG. 5 is beforehand displayed on the color display 20313. In this situation, when the user selects item 1 "With try-on service" by the mouse 20122, the client 201 inputs the try-on service request.

<Client: Step 3002> Transmission of try-on service request

The try-on service request inputted via the mouse 20122 is immediately sent via the CATV line 203 to the server 202.

<Server: Step 4001> Reception of try-on service request

The server receives the try-on service request sent from the client via the CATV line 203.

<Server: Step 4002> Retrieval of try-on service request executable program

According to the try-on service request, the server retrieves the executable program 4101 from the optical disk 2022. Incidentally, the information processing technology is also applied to the program 4101.

Figure 6:
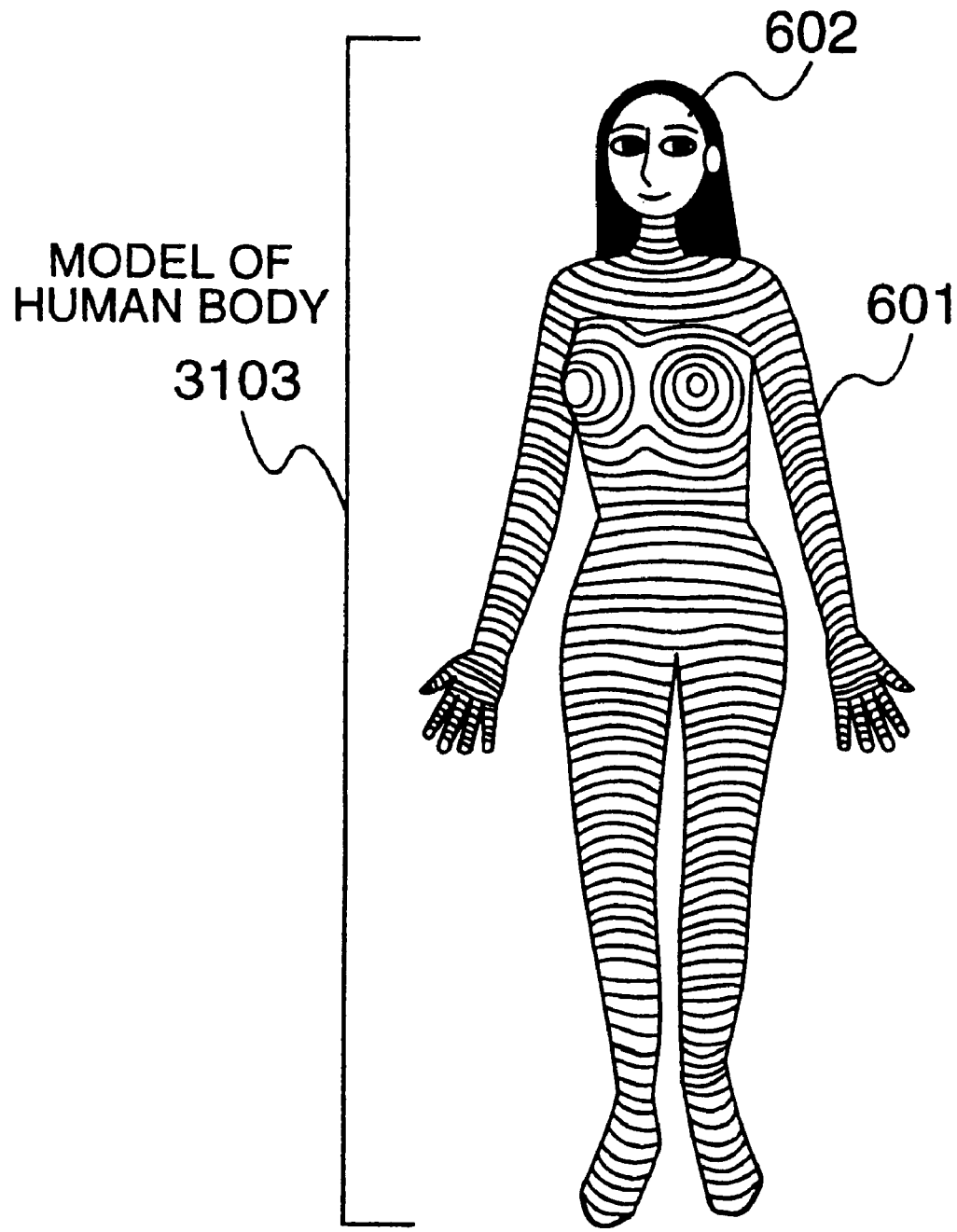
FIG. 6 is a diagram showing an example of a human body model stored in an IC card.

FIG. 6 is a diagram showing an example of a model of a human body stored in an IC card.

<Server: Step 4003> Transmission of try-on service executable program

The server sends the try-on service executable program 4101 retrieved from the optical disk 2022 through the CATV line 203 to the client 201.

<Client: Step 3003> Reception of try-on service executable program

The client receives the try-on service executable program 4101 transmitted from the server 202 via the CATV line 203.

<Client: Step 3004> Storage of try-on service executable program

The client stores on the magnetic disk the try-on service executable program 4101 transmitted from the server 202.

<Client: Step 3005> Input of physical data of try-oner

FIG. 6 shows an example of a model of human body 3103. The physical data items such as those of the face and body contour are related to privacy of the try-oner (not limited to the service user) and hence is required to be carefully controlled. In this connection, when the data is stored in an IC card having high security, even if the IC card is lost, the data is guaranteed because the data cannot be read by any third person. Additionally, since the IC card is superior in portability, when the holder thereof usually carries the card with him or her, it is possible for the holder to receive the try-on service at an arbitrary place. In this step, as shown in FIG. 6, a 3D model of human body prepared by attaching a face image of try-oner 602 onto a body shape thereof 601 beforehand stored in the IC card 3102 is inputted via the IC card reader 20123.

In this regard, as technologies to measure data of a human contour, there have been known a direct measuring method and an automatic contactless measuring method, for example, described in pages 781 to 786 of "3D Measurement of Human Body" written by Hiroshi Nakano (Journal of Society of Instrument and Control Engineers, Vol. 27, No. 9, September 1988.

As the former, namely, direct measuring method, there exists a famous method recommended by the committee for measurement of living body of the Institute of Human Engineering of Japan. This is a conventional low-cost measuring method. On the other hand, the latter, i.e., automatic contactless measuring method, is an appropriate and simple method as represented by a stereo-photography and a slit light projection method. However, this requires an expensive measuring apparatus and hence leads to a problem that the place in which the method is employed is limited. In consequence, the method is basically used as follows. When the user visits a shop in which the measuring apparatus is installed, the correct data of his or her body contour is measured (again) to be stored in the IC card 3102 in the form in which the face image is fixed thereonto. However, when such a chance is not available, there can be considered a utilization mode in which the former is employe in place of the latter (in a service receiving place such as a room of a family). In this connection, the body contour data items (numeric values) obtained by the former are manually inputted from the keyboard 2012 by the user such that a face image inputted separatedly from the TV camera 20124 is attached thereonto, for example, in a two-dimensional manner.

<Client: Step 3006> Transmission of goods guide information

The service provider (Hitachi in this case) sends a request of guide information of goods scheduled for sales via the CATV network 203 to the server 202. Incidentally, when this step is first executed, the operation is conducted beginning at the first position of the goods guide information; whereas, for the second and subsequent executions of this step, the operation is achieved beginning at the previously stopped position of the information.

<Server: Step 4004> Reception of goods guide information

The server 202 receives the request of guide information of goods sent from the client 201 via the CATV network 203.

<Server: Step 4005> Retrieval of goods guide information

According to the request of guide information of goods received from the client 201, the server 202 retrieves the corresponding goods guide information from the optical disk 2022.

<Server: Step 4006> Transmission of goods guide information

The server 202 sends the goods guide information retrieved from the optical disk 2022 via the CATV line 203 to the client 201.

<Client: Step 3007> Reception of goods guide information

The goods guide information sent from the server 202 is received via the CATV line 203.

<Client: Step 3008> Continuous output start of goods guide information

To present articles and items in a realistic manner for easy understanding thereof, the goods guide information sent from the server 202 is expressed in various media (voices, moving pictures, still pictures, characters and letters). of the media, voices are sent to the stereo-speaker 2013 and the others are outputted to the color display 2013.

Figure 7:
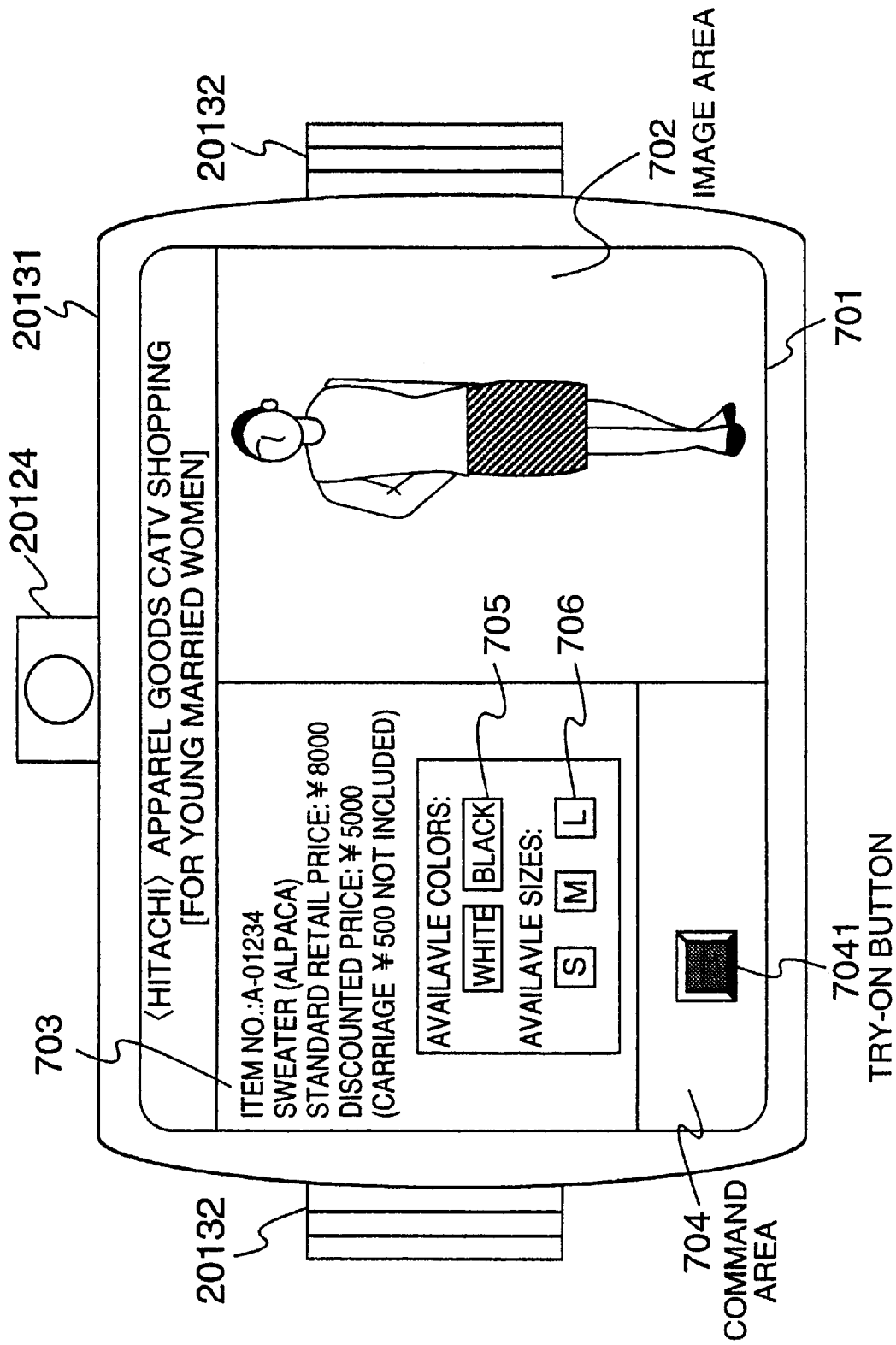
FIG. 7 is a diagram showing an output image of goods guide information.

FIG. 7 is an image diagram showing a method of outputting the goods guide information. The color display 20131 has a screen 701 subdivided into three areas (goods image area 702, goods attribute area 703, and command area 704).

<Client: Step 3009> Input of identifier of goods for try-on

On detecting a desired item in the goods guide information being outputted, the user selects a try-on button 7041 in the command area 704 by the mouse 20122. The client regards the item being displayed (sweater made of alpaca) has an item number (A-012345) of the try-on goods for the user. This however is insufficient to uniquely identify an item and it is therefore necessary to additionally push by the mouse 20122 a color button 705 and a size button 706 in the attribute area 703 for specification of color and size.

<Client: Step 3010> Temporary interruption of continuous output of goods guide information At timing of depression of the try-on button 7041, the continuous output of goods guide information is temporarily interrupted. Specifically, a mobile picture in the goods image area 702 is captured to be set to a state of a still picture and the voice output is stopped.

<Client: Step 3011> Transmission of try-on goods identifier

The try-on goods identifier (item number, color, and size) selected by the mouse 20122 is sent via the CATV line 203 to the server 202.

<Server: Step 4007> Reception of try-on goods identifier

The try-on goods identifier sent from the server 202 is received via the CATV line 203.

<Server: Step 4008> Retrieval of try-on data for try-on item

Try-on data 4102 corresponding to the try-on goods identifier received from the client 201 is retrieved from the optical disk 2022. In this connection, the try-on data includes a 3D contour and texture of the try-on goods.

<Server: Step 4009> Transmission of try-on data for try-on goods

The try-on data 4102 retrieved from the optical disk 2022 is sent via the CATV line 203 to the client 201.

<Client: Step 3012> Reception of try-on data for try-on goods

The try-on data 4102 sent from the server 202 is received via the CATV line 203.

<Client: Step 3013> Try-on processing

The try-on service executing program stored on the magnetic disk 2014 is invoked to execute the try-on processing. Specifically, the try-on data of try-on goods 4103 is attached onto the human body model 3103 of the try-oner in a 3D fashion to produce "external image (→appearance)" and then "values of stress (→comfortness)" are calculated for significant positions (e.g., for the breast, neck, and upper arm). Incidentally, when the try-on data of articles already possessed by the try-oner, it is possible to confirm coordination of the item of the current try-on with such articles.

In the try-on process as described above, the human body model of the try-oner is converted into values of stress representing comfortness. This means, it is impossible to restore the original human body model from the values of stress expressing comfortness.

<Client: Step 3014> Output of results from try-on processing

Figure 8:
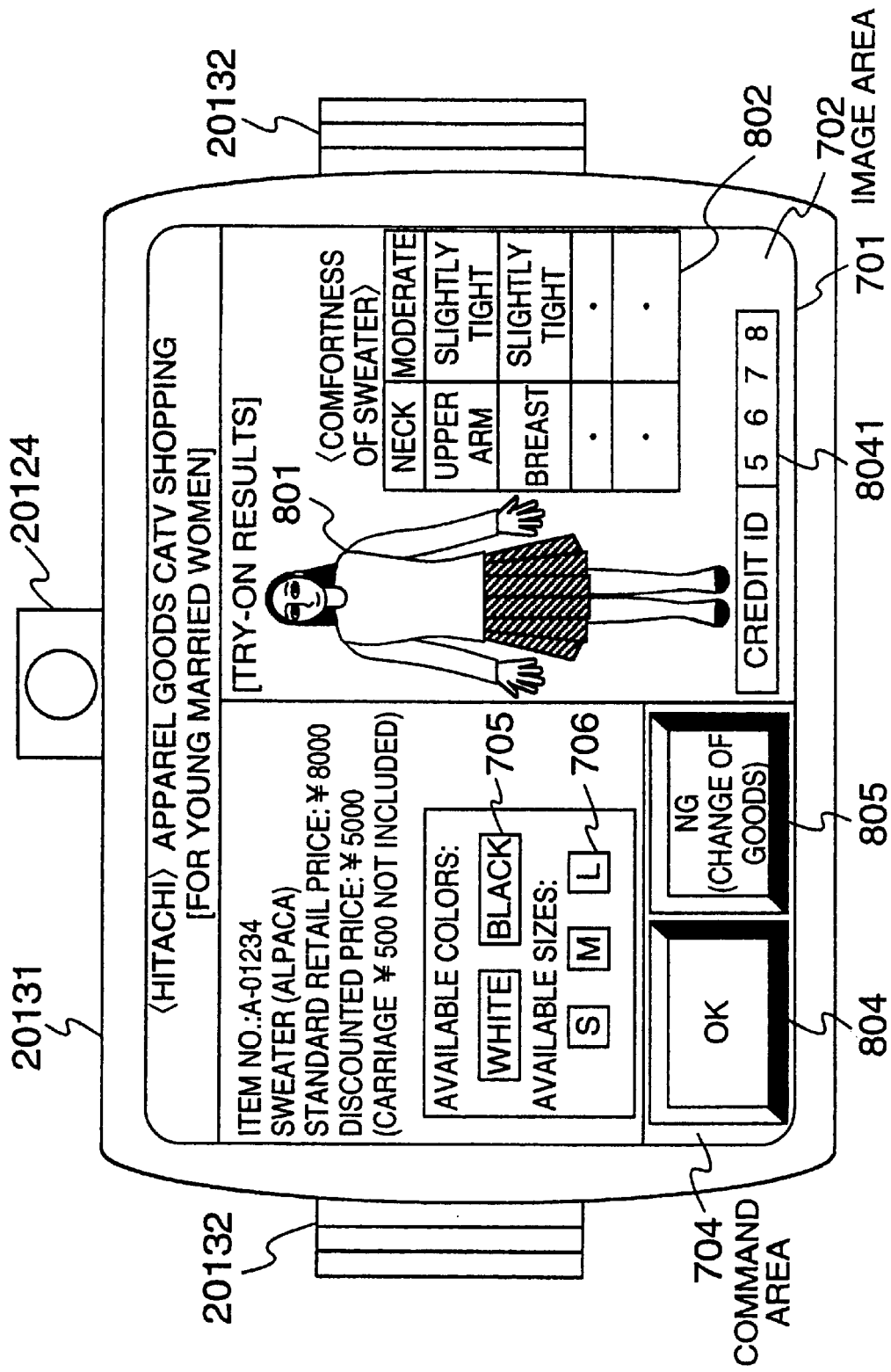
FIG. 8 is a diagram showing an output image of try-on process results.

FIG. 8 is a diagram showing an output image of results from the try-on processing.

The 3D external image 801 (coordinated image with an item 803 beforehand possessed by the user and the associated values of stress 802 obtained by the try-on processing are presented on the color display 20131. In this regard, the values of stress are not familiar to unexperienced persons and hence are converted according to five-stage representation (loose, very loose, moderate, slightly tight, and tight) before the presentation thereof. For example, when the stress value is three or less, "tight" is indicated; whereas, when the value is in a range from four to five, "slightly tight" is displayed. When the value is from six to seven, "moderate" is presented; when the value is from eight to nine, "slightly loose" is indicated; and when the value is ten or more, "loose" is presented. Furthermore, to instinctively recognize the stress values, the values may be displayed in associated colors in five stages.

<Client: Step 30141> Transmission of image of try-on processing results

Additionally, when a portion of the face is processed in the external image 801 to be sent to the server side 202, it is possible to receive an opinion of an expert in a manner similar to that used for a video-phone.

<Server: Step 40091> Reception of try-on processing results

The server 202 receives the image of the try-on processing results sent from the client.

<Server: Step 40092> Attaining of opinion of expert

Presenting the image of the try-on processing results sent from the client, there is attained an opinion from the expert.

<Server: Step 40093> Transmission of advice

It is also possible that the expert converses directly with the client to interactively achieve conversation. Otherwise, the server sends the opinion as an advice to the client.

<Client: Step 30142> Reception of advice

The client receives the advice sent from the server or conducts conversation directly with the expert to receive his or her opinion.

<Client: Step 3015> Input of evaluation of try-on processing results

Referring to the advice, when the processing results are satisfactory, the client pushes an OK button 804 by the mouse 20122 for selection and input thereof to thereby express an intention to buy the try-on article. In this case, the client inputs from the keyboard 20121 an ID code 8041 of the credit card necessary for the payment. On the other hand, when the results are unsatisfactory, the client pushes an NG button 805 by the mouse 20122 for selection and input thereof.

<Client: Step 3016> Branch decision by evaluation

When OK is inputted in step 3015, control is passed to <Client: Step 3071>; when NG is inputted, control is transferred to <Client: Step 3008>.

<Client: Step 3017> Transmission of intention to buy try-on article

The inputted intention (including the credit ID and personal number) to buy the try-on article is sent via the CATV line 203 to the server 202.

<Server: Step 4010> Reception of intention to buy try-on article

The intention to buy the try-on article sent from the server 202 is received via the CATV line 203.

<Server: Step 4011> Sales processing

According to the intention to buy try-on article sent from the client 201, the server achieves a predetermined sales processing (e.g., a check for the credit).

<Server: Step 4012> Transmission of results of sales processing

When the credit check does not show any problem, a message of completion of procedure is transmitted via the CATV line 203 to the client 201. If there exists any problem, a notification of "sales rejection" is similarly sent to the client 201.

<Client: Step 3018> Reception of results of sales processing

The results of sales processing sent from the server 202 is received via the CATV line 203.

<Client: Step 3019> Removal of try-on service executable program

Confirming the reception of results of sales processing, the try-on service executable program, which is no longer necessary in this stage, is removed from the magnetic disk 2014. In this regard, the try-on service executable program may include a function to remove itself. When it is recognized that the program is unnecessary (when the sales processing results are received), the program remove function is initiated. This consequently leads to an advantage that the step can be automatically executed without necessitating the manual action of the user while preventing illegal uses thereof by the user for another purpose.

According to the second embodiment as described above, it is possible to encourage the consumers, who have hesitated to use the CATV shopping of apparel goods because "try-on service is unavailable" or "they do not desire to receive try-on service", to access the CATV shopping. This consequently remarkably contributes to expansion of enterprises of CATV shopping.

As above, description has been given of an example in which the present invention is applied to the CATV shopping system of apparel goods; however, the present invention is not limited to the system. For example, the present invention is also applicable to an online shopping system of financial services such as an education loan.

In general, to design an education load, there are required such data items having high secrecy as the family constitution, annual income, and financial states with other banking facilities. Consequently, there exists no problem for a client who have decided to borrow money and who is willing to present the secret data items. However, there exists a client who desires to request a plurality of banking facilities to design the education loan (in a so-called window-shopping fashion) on trial so as to compare designed results with each other for determination of the bank for the education loan. In this case, there arises a problem that the client may be hesitant about using the online shopping system. This problem can be solved by use of the present invention.

FIGS. 9 and 10 are system constitution diagrams respectively of the client and server in the online interactive service system.

Description will be given of a method of applying the online interactive service system in the system of the present invention to various services in the constitution diagram shown in FIG. 2. In this connection, the description related to FIGS. 9 and 10 will be given in association with the functions described by referring to FIG. 1.

The client 201 shown in FIG. 9 includes an input device 2012, an output device 2013, a storage 2014, an input/output interface 901 to control the above facilities, and a communication interface 902. The client 201 further includes irreversible process means 903 for conducting an irreversible process of secret data on the user side by use of the service executable program and data on the server side and branch control means 904 responsive to evaluation of process results.

First, the user inputs from the input device 2012 a service identifier of desired one of such various services as bank loan, construction design, preparatory school for colleges, English conversation, travels, transactions of immovables, and transactions of stocks and bonds and debentures. The inputted identifier is sent via the communication network 203 to the server 202. A program to execute the service corresponding to the identifier is received from the server 202 via the communication network. The received program is stored in the storage 2014. Data to be controlled by the user of the client 201 is inputted from the input device 2012. From the input device 2012, the user inputs a transmission request for data controlled by the server 202. The inputted data transmission request is sent via the network 203 to the server 202. Using the program stored in the storage 2014 and the received data, the inputted data is irreversibly processed by the irreversible process means 903. Processed results are outputted from the output device 2013. The process results are sent to the server 202 to receive an advice from an expert. Referring to the advice, evaluation of the outputted results is inputted from the input device 2012. If the inputted evaluation is unsatisfactory, a transmission request is again issued to the server 202 for another data. If the evaluation is satisfactory, a branch control operation is carried out by the branch control means 904 according to the evaluation of process results. Finally, the process results are sent via the network 203 to the server 202.

On the other hand, the server 202 shown in FIG. 10 includes a storage 2022, an input/output interface 1001 to control the storage 2022, and a communication interface 1002. First, the server 202 receives via the communication network 203 an identifier sent from the client 201.

The server 202 retrieves from the storage 2022 a program to execute one of the various services corresponding to the received identifier. The retrieved program is sent via the network 203 to the client 201. The server receives via the network 203 a data transmission request issued from the client 201. The server retrieves data corresponding to the transmission request from the storage 2022. The retrieved data is sent via the network 203 to the client 201. The server receives via the network 203 processing results sent from the client 201.

According to the embodiment as described above, various services can be received in the online interactive service system. Moreover, the service receiver can utilize a highly value-added service utilizing secret data thereof without presenting the secret data to the service provider.

Furthermore, the embodiment is suggestive for a case in which the respective functions to be implemented by a computer are realized by dedicated circuits, which is consequently useful for circuit engineers to construct dedicated apparatuses.

As described in detail above, in an online interactive service system according to the present invention, the service receiver can use a highly value-added service employing secret data thereof without presenting the secret data to the service provider. This consequently leads to an advantage that the service receiver can simply receive services in cases in which secret data is possessed by the receiver, the cases naturally including the virtual try-on as well as provisional design of education loan, housing loan, and business loan; provisional design of housing, consultation on transactions of real estate, and consultation on transactions of stocks and bonds and debentures While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A method for performing an online interactive service using an irreversible process in an online interactive service system including a server, for providing a plurality of services, coupled to a client for receiving the services, comprising:

inputting original information to the client from an input device communicating with the client, the original information having a high degree of secrecy from the server;

within the client, executing a predetermined process on the original information for producing transformed information, the original information not being capable of being restored from the transformed information; and outputting the transformed information from the client to the server for receiving an online interactive service corresponding to the original information.

2. The method for performing an online interactive service as set forth in claim 1, wherein:

the step of inputting includes:
inputting physical data of a try-oner; and
the step of executing includes:
producing try-on process data as a function of the physical data, the try-on process data corresponding to the transformed information.

3. A method for performing an online interactive service using an irreversible process in an online interactive service system including a server, for providing a plurality of services, coupled to a client for receiving the services, comprising:

inputting a program, for executing a predetermined process, to the client from the server;

inputting original information to the client from an input device communicating with the client, the original information having a high degree of secrecy from the server;

within the client, executing the predetermined process on the original information for producing transformed information, the original information not being capable of being restored from the transformed information; and outputting the transformed information from the client to the server for receiving an online interactive service corresponding to the original information.

4. The method for performing an online interactive service as set forth in claim 3, wherein:

the step of inputting includes:
inputting physical data of a try-oner; and
the step of executing includes:
producing try-on process data as a function of the physical data, the try-on process data corresponding to the transformed information.

5. A method for performing an online interactive service using an irreversible process in an online interactive service system including a server, for providing a plurality of services, coupled to a client for receiving the services, comprising:

receiving a request, from the client into the server, for sending a program for executing a predetermined process;

sending the program from the server to the client, the predetermined process generating resulting data corresponding to input data, the input data having a high degree of secrecy from the server and not being capable of being restored from the resulting data; and receiving the resulting data into the server from the client.

6. A system for providing an online interactive service using an irreversible process in an online interactive service system, the system including a server, for providing services, coupled to a client for receiving the services, said client comprising:

an input device for inputting original information from an input device of the client, the original information having a high degree of secrecy from the server;

executing means for executing a predetermined process for producing resulting information corresponding to the original information, the original information not being capable of being restored from the resulting information; and an output device for outputting the resulting information to the server, the server producing the online interactive service as a function of the resulting information.

7. A system for providing an online interactive service using an irreversible process in an online interactive service system, the system including a server, for providing services, coupled to a client for receiving the services, said client comprising:

an input device for inputting a program for executing a predetermined process from the server;

input means for inputting original information, having a high degree of secrecy from the server, from a client input device;

executing means for executing the program for executing the predetermined process for producing output information as a function of the original information, the original information not being capable of being restored from the output information; and an output device for outputting the output information of the predetermined process to the server, the server providing the online interactive service corresponding to the output information.

8. A method for performing an online interactive service, based on a program stored on a computer readable storage medium, using an irreversible process in an online interactive service system including a server, for providing a plurality of services, coupled to a client for receiving the services, comprising:

inputting original information to the client from an input device communicating with the client, the original information having a high degree of secrecy from the server;

within the client, executing a predetermined process on the original information for producing transformed information, the original information not being capable of being restored from the transformed information; and outputting the transformed information from the client to the server for receiving an online interactive service corresponding to the original information.

9. A method for performing an online interactive service, based on a program stored on a computer readable storage medium, using an irreversible process in an online interactive service system including a server, for providing a plurality of services, coupled to a client for receiving the services, comprising:

inputting the program from the server to the client, the program executing a predetermined process;

inputting original information to the client from an input device communicating with the client, the original information having a high degree of secrecy from the server;

within the client, executing the program of the predetermined process for generating resulting information as a function of the original information, the original information not being capable of being restored from the resulting information; and outputting the resulting information of the predetermined process from the client to the server where the online interactive service is performed on the resulting information, the resulting information corresponding to the original information.

10. A system for providing an online interactive service using an irreversible process in an online interactive service system, the system including a server, for providing services, coupled to a client for receiving the services, the server comprising:

first receiving means for receiving a request from the client for sending a program for executing a predetermined process;

sending means for sending the program of the predetermined process to the client, input data to the program of the predetermined process having a high degree of secrecy from the server and not being capable of being restored from resulting data produced by the predetermined process; and second receiving means for receiving the resulting data of the predetermined process from the client, the resulting data corresponding to the input data inputted in the client.

11. A method for performing an online interactive service, based on a program stored on a computer readable storage medium, using an irreversible process in an online interactive service system including a server, for providing a plurality of services, coupled to a client for receiving the services, comprising:

receiving a request, from the client into the server, for sending a program for executing a predetermined process;

sending the program of the predetermined process from the server to the client, input data to the program of the predetermined process having a high degree of secrecy from the server and not being capable of being restored from resulting data produced by the predetermined process; and receiving the resulting data from said client into the server, the resulting data corresponding to the input data inputted in the client.

* * * * *